United States Patent
Lin et al.

(10) Patent No.: US 11,146,174 B2
(45) Date of Patent: Oct. 12, 2021

(54) DYNAMIC MULT-FUNCTIONAL POWER CONTROLLER

(71) Applicant: INNO-TECH CO., LTD., Taipei (TW)

(72) Inventors: Chih-Feng Lin, Taipei (TW); Shu-Chia Lin, Taipei (TW); Tsu-Huai Chan, Taipei (TW)

(73) Assignee: INNO-TECH CO., LTD., Taipei (TW)

( * ) Notice: Subject to any disclaimer, the term of this patent is extended or adjusted under 35 U.S.C. 154(b) by 38 days.

(21) Appl. No.: 16/749,130

(22) Filed: Jan. 22, 2020

(65) Prior Publication Data

US 2021/0175811 A1 Jun. 10, 2021

(30) Foreign Application Priority Data

Dec. 10, 2019 (TW) .................................. 108145128

(51) Int. Cl.
| | |
|---|---|
| *H02M 3/335* | (2006.01) |
| *H02M 1/08* | (2006.01) |
| *H02M 1/32* | (2007.01) |
| *H02M 1/36* | (2007.01) |
| *H02H 3/247* | (2006.01) |
| *H02M 1/00* | (2006.01) |

(52) U.S. Cl.
CPC ........ *H02M 3/33523* (2013.01); *H02H 3/247* (2013.01); *H02M 1/08* (2013.01); *H02M 1/32* (2013.01); *H02M 1/36* (2013.01); *H02M 1/0009* (2021.05)

(58) Field of Classification Search
CPC ...... H02M 3/33523; H02M 1/08; H02M 1/32; H02M 1/36; H02M 2001/0009; H02H 3/247
See application file for complete search history.

(56) References Cited

U.S. PATENT DOCUMENTS

| | | | |
|---|---|---|---|
| 7,746,615 B2* | 6/2010 | Zhu .................. | H02M 3/33507 361/97 |
| 9,742,293 B2* | 8/2017 | Lin ........................ | H02M 1/32 |
| 10,756,636 B2* | 8/2020 | Sato .................. | H02M 3/33523 |
| 2004/0145924 A1* | 7/2004 | Jang ........................ | H02M 1/36 363/20 |
| 2011/0305047 A1* | 12/2011 | Jungreis ............ | H02M 3/33523 363/21.02 |

(Continued)

*Primary Examiner* — Kyle J Moody
(74) *Attorney, Agent, or Firm* — Lin & Associates IP, Inc.

(57) ABSTRACT

Disclosed is a dynamic multi-functional power controller in collocation with a primary side coil, a switching unit, and a current sensing resistor, performing a power control process. An induced current is generated by a secondary side coil coupled with the primary side coil through electromagnetic interaction with a conduction current flowing through the primary side coil, and an output power is generated to supply an external load when the induced current flows through an output rectification unit and an output filter unit. The power control process includes detecting if any abnormal state occurs, stopping a driving signal, waiting for a period of time, and then re-sending the driving signal. Thus, the present invention provides protection for various kinds of peak loading, avoids high power state when an abnormal state is not resolved, and further reduces the average output power, thereby implementing power saving.

10 Claims, 7 Drawing Sheets

(56) References Cited

U.S. PATENT DOCUMENTS

| | | | |
|---|---|---|---|
| 2012/0033465 A1* | 2/2012 | Lee | H02M 3/33507 363/53 |
| 2015/0318777 A1* | 11/2015 | Pasqua | H02M 3/33523 363/21.13 |
| 2016/0172841 A1* | 6/2016 | Lee | H02H 3/247 363/21.02 |
| 2016/0172986 A1* | 6/2016 | Hayakawa | H02M 3/33523 363/21.15 |
| 2016/0226388 A1* | 8/2016 | Ren | H02M 3/33507 |
| 2016/0352237 A1* | 12/2016 | Quigley | H02M 3/33515 |
| 2019/0115841 A1* | 4/2019 | Maruyama | H02M 3/156 |

* cited by examiner

DYNAMIC MULT-FUNCTIONAL POWER CONTROLLER

CROSS-REFERENCE TO RELATED APPLICATION

This application claims the priority of Taiwanese patent application No. 108145128, filed on Dec. 10, 2019, which is incorporated herewith by reference.

BACKGROUND OF THE INVENTION

1. Field of the Invention

The present invention relates to a power controller, and more specifically to a dynamic multi-functional power controller handling various kinds of peak loading, detecting one of the instantaneous output current and the instantaneous output power, and one of the average output current and the average output power, and providing appropriate protection by immediately stopping sending a driving signal in case of abnormal state, and then re-sending the driving signal after a period of time, thereby avoiding long time high power state because of abnormal state being not resolved, and further reducing the average output power to implement power saving.

2. The Prior Arts

As well known, many electrical appliances such as electric motors, usually suffer from peak load at the beginning of powering on, considered as an abnormal state. For instance, the motor consuming 60 W power and operating at 12V has a normal operating current 5 A (=60/12), but at the moment of powering on, the operating current may attain to 10 A and sustain about 2 seconds. To avoid Under voltage-Lockout (UVLO) upon powering on, the size of the transformer is usually scaled up to somewhat safe extent. However, the abnormal period is very short, and the above transformer thus causes an over design issue.

In the prior arts, protection mechanism of auto recovery is employed to avoid an over design transformer. Simply speaking, when over loading occurs, the system immediately stops the Pulse Width Modulation (PWM) driving signal, then performs several times of auto recovery, and when the protection condition vanishes during Auto recovery, the normal operation for the system is recovered.

However, one of the shortcomings in the prior arts is that if the protection condition still exists after many times of auto recovery, the system enters latch mode, which causes the system to fail to perform normal operation and stop working. As a result, only physical or manual manner like hand switching off/on the power switch can resolve the event of latch mode.

Therefore, it is greatly needed to provide a new dynamic multi-functional power controller, which handles various kinds of peak loading, detects one of the instantaneous output current and the instantaneous output power, and one of the average output current and the average output power, and provides appropriate protection by immediately stopping sending a driving signal in case of abnormal state, and then re-sending the driving signal after a period of time so as to avoid long-term high power state because of abnormal state being not resolved, and greatly reduce the average output power to implement power saving, thereby overcoming the problems in the prior arts.

SUMMARY OF THE INVENTION

The primary objective of the present invention is to provide a dynamic multi-functional power controller performing a power control process to generate and send a Pulse Width Modulation (PWM) driving signal to drive a switching unit connected to the controller. In addition, a primary side coil, a switching unit, and a current sensing resistor are sequentially connected in series across the input power and the ground level, and the conduction current flowing through the primary coil is employed to induce an induced current flowing through a secondary side coil coupled with the primary side coil due to electromagnetic interaction. Further, the induced current flows through an output rectification unit and an output filter unit connected in series, which generates an output power to supply an external load. Also, two ends of the current sensing resistor generate a current sensing voltage resulting from the conduction current.

Specifically, the power control process comprises: a starting step, in which the system comprising the dynamic multi-functional power controller, the switching unit, the primary side coil, the secondary side coil, the switching unit, the current sensing resistor, the output rectification unit, and the output filter unit is powered on; a signal generating step, in which the PWM driving signal is generated and sent to the switching unit to conduct or cut off the conduction current of the switching unit; a detection step, in which a comparison voltage corresponding to the output power is employed to detect any abnormal state which occurs when the comparison voltage is greater than a threshold voltage; in case of no abnormal state, the system returns back to the signal generating step to continuously send the PWM driving signal; if the abnormal state occurs, the PWM driving signal is not generated, the controller waits for a period of waiting time, then the PWM driving signal is re-sent to perform an auto recovery operation to, and the controller returns back to the detection step.

Further, the comparison voltage is generated by a feedback circuit connected to the external load and the controller, or alternatively, generated by the controller employing the current sensing voltage and the input power. In particular, the PWM driving signal has a frequency between 20-300 KHz, and is dynamically adjusted according to the comparison voltage.

Therefore, the power controller of the present invention handles various kinds of peak loading, detects one of the instantaneous output current and the instantaneous output power, and one of the average output current and the average output power, and provides appropriate protection by immediately stopping sending a driving signal in case of abnormal state, and then re-sending the driving signal after a period of time, thereby avoiding long time high power state because of abnormal state being not resolved, and further reducing the average output power to implement power saving.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
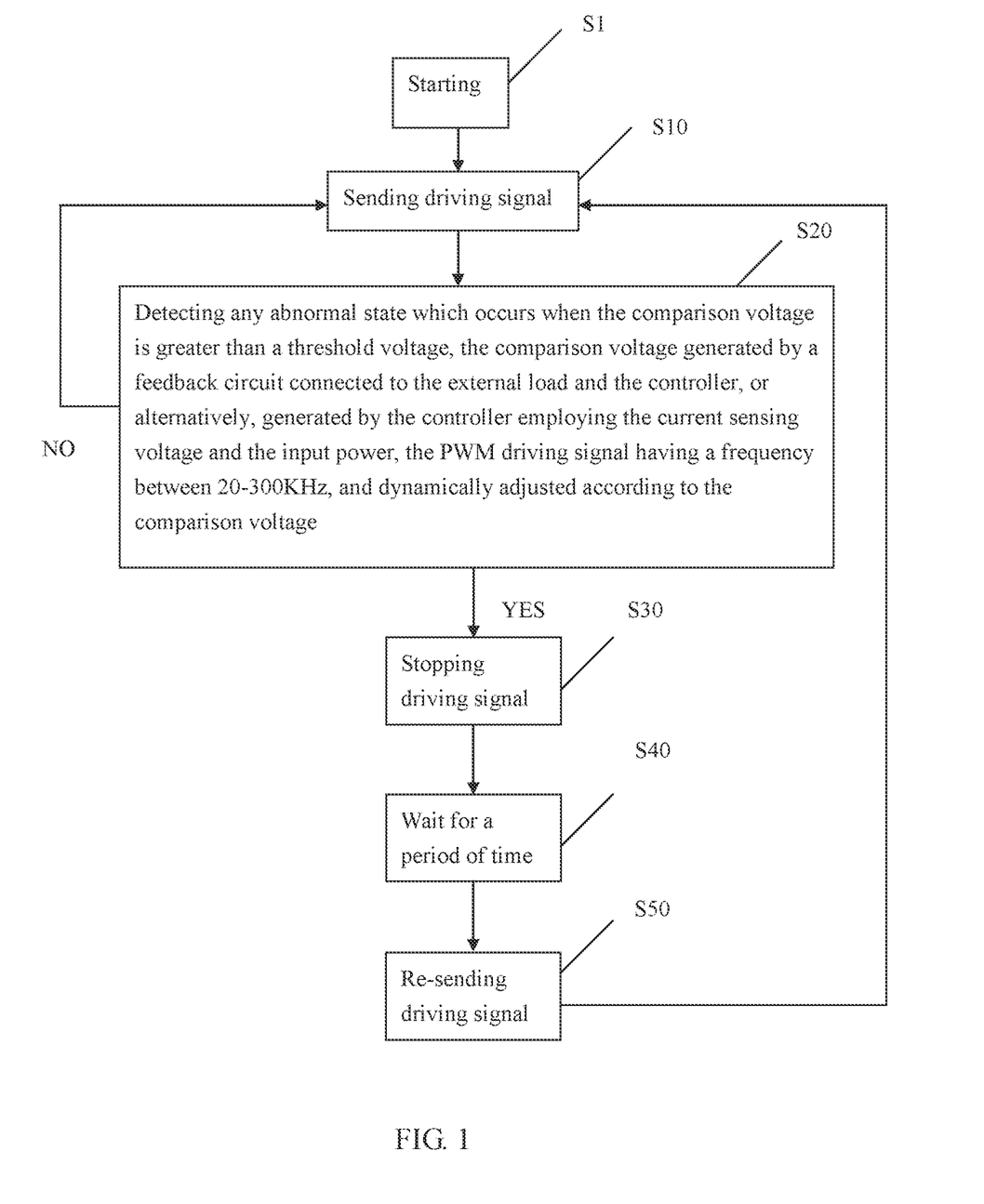
FIG. 1 shows a flowchart of the dynamic multi-functional power controller according to the embodiment of the present invention.
Figure 2:
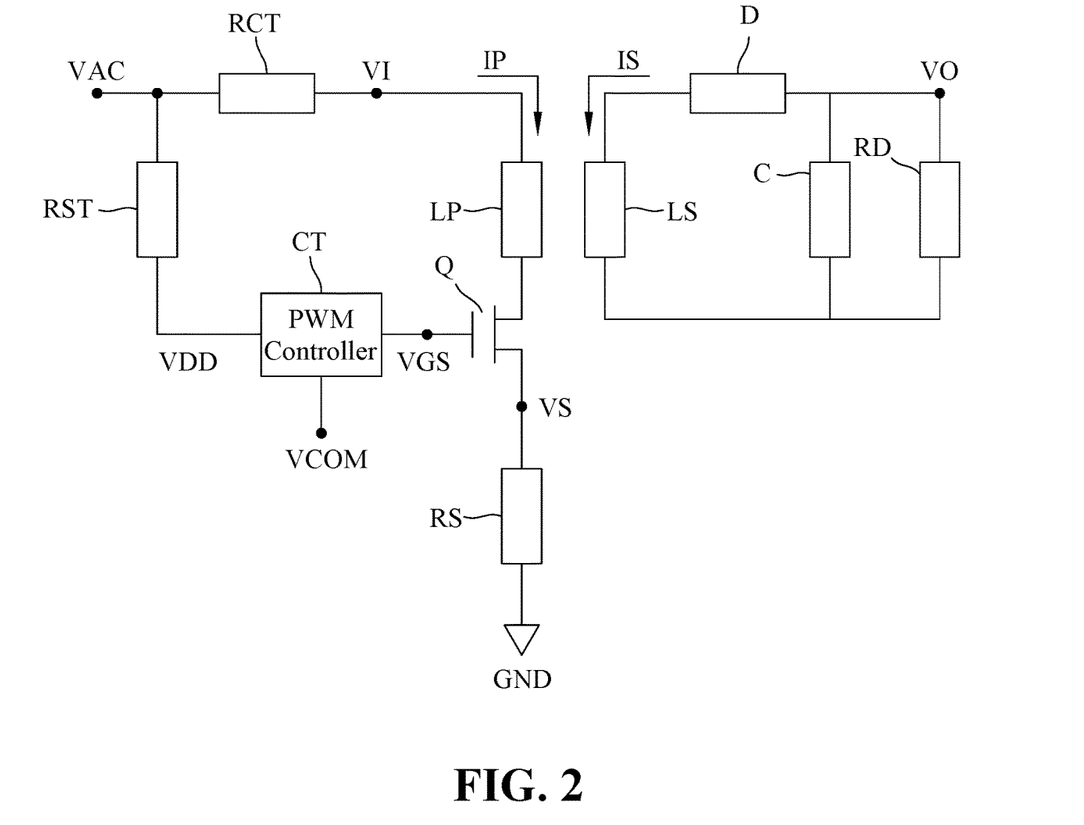
FIG. 2 shows a view of one illustrative example of the dynamic multi-functional power controller according to the embodiment of the present invention.

Please refer to FIGS. 1 and 2. FIG. 1 shows a flowchart of the dynamic multi-functional power controller according to the embodiment of the present invention, and FIG. 2 shows a view of one illustrative example of the dynamic multi-functional power controller CT according to the embodiment of the present invention. As shown in FIGS. 1 and 2, the dynamic multi-functional power controller CT according to the present invention performs a power control process comprising the steps S1, S10, S20, S30, S40, and S50 for generating a Pulse Width Modulation (PWM) driving signal VGS. Further, the PWM driving signal VGS is employed to drive a switching unit Q connected to the dynamic multi-functional power controller CT. For instance, the switching unit Q comprises a Metal-Oxide-Semiconductor (MOS) element or a bipolar element. However, it should be noted that only the MOS element as an illustrative example is shown in figures for clear description of the present invention, and not intended to limit the scope of the present invention. In other words, the PWM driving signal VGS is sent to a gate of the switching unit Q for the MOS element, or the PWM driving signal VGS is sent to a base of the switching unit Q for the bipolar element. Substantially, the PWM driving signal VGS is a pulse stream with a specific frequency, and the frequency generally depends on the loading state in the actual application. With this, it is preferred for the present invention that the frequency of the PWM driving signal VGS is 20-300 KHz.

Further, a primary side coil LP (of a transformer), a switching unit Q, and a current sensing resistor RS are sequentially connected in series across an input power VI and a ground level GND, and a conduction current IP flowing through the primary coil LP is employed to induce an induced current IS flowing through a secondary side coil LS coupled with the primary side coil LP due to electromagnetic interaction. The induced current IS flows through an output rectification unit D and an output filter unit C connected in series, and an output power VO is generated by the output rectification unit D and the output filter unit C to supply an external load RD. More specifically, the secondary side coil LS, the output rectification unit D, and the output filter unit C are sequentially connected in series, and the external load RD is connected to the output filter unit C in parallel.

For instance, the output rectification unit D is a diode for implementing rectification, and the output filter unit C is a capacitor for stabilizing the output power VO through a filter function.

In addition, the rectification unit RCT receives the input AC power VAC and generates the input power VI through rectification. Preferably, the input AC power VAC is 90-400V, and the frequency of the input AC power VAC is 50 Hz, 60 Hz, or 400 Hz.

Moreover, the dynamic multi-functional power controller CT is further in collocation with a controller rectification unit RST for receiving a controller power VDD. In other words, the dynamic multi-functional power controller CT begins the power control process after receiving the controller power VDD. Specifically, the controller rectification unit RST receives the input AC power VAC, and generates the controller power VDD through an auxiliary rectification process. Further, the controller rectification unit RST can be implemented by many electrical means, which are well known in the prior arts, and only brief description is mentioned hereinafter.

For instance, the controller rectification unit RST comprises two auxiliary voltage division resistors, an auxiliary regulation capacitor, an auxiliary rectification diode, an auxiliary resistor, and an auxiliary coil (not shown). The two auxiliary voltage division resistors are connected in series and further across the input AC power VAC, and the auxiliary regulation capacitor is connected between the ground level GND and a connection point of the two auxiliary voltage division resistors. Also, the auxiliary rectification diode, the auxiliary resistor, and the auxiliary coil are sequentially connected in series between the connection point of the two auxiliary voltage division resistors and the ground level GND. In particular, a negative end of the auxiliary rectification diode is connected to the connection point of the two auxiliary voltage division resistors. The auxiliary coil is coupled with the primary side coil LP and generates an auxiliary current through electromagnetic interaction. The auxiliary current further flows through the auxiliary resistor and the auxiliary rectification diode to charge the auxiliary regulation capacitor for storing electric energy, and the controller power VDD is generated by the auxiliary regulation capacitor to supply the dynamic multi-functional power controller CT. Obviously, the controller power VDD is influenced by the conduction current IP of the primary side coil LP, and the conduction current IP also affects the output power VO and the comparison voltage VCOM. That is, the controller power VDD, the conduction current IP, the output power VO, and the comparison voltage VCOM are mutually affected. When the abnormal state occurs, not only the output power VO is affected, but also the controller power VDD.

The above mentioned power control process of the dynamic multi-functional power controller CT begins at the step S1 performed by powering on a system, which comprises the dynamic multi-functional power controller CT, the switching unit Q, the primary side coil LP, the secondary side coil LS, the current sensing resistor RS, the output rectification unit D, and the output filter unit C. In other words, the input AC power VAC is asserted, and the input power VI is generated. Then, the step S10 also mentioned as a signal generating step is performed to generate the PWM driving signal VGS to drive the switching unit Q. Specifically, the PWM driving signal VGS is generated and sent to the gate of the switching unit Q to conduct or cut off the conduction current IP of the switching unit Q. Further, the conduction current IP causes two ends of the current sensing resistor RS to generate a current sensing voltage VS.

The step S20 also mentioned as a detection step is executed to employ the comparison voltage VCOM corresponding to the output power VO to detect any abnormal state. If no abnormal state occurs, the power control process returns back to the step S20 for continuously generating and sending the PWM driving signal VGS. In case of abnormal state, the step 30 is performed. Specifically, the above mentioned abnormal state means the comparison voltage VCOM is greater than a threshold voltage, and the output power VO undergoes over-loading. Moreover, many appliances suffer a considerable high current in a very short period of time upon powering on, and the considerable high current is usually called peak load, which is also abnormal state. In other words, abnormal state herein comprises at least one of over-loading and peak load.

The comparison voltage VCOM is generated by a feedback circuit (not shown), which connected between the external load RD and the dynamic multi-functional power controller CT. For example, the feedback circuit is implemented by a photo coupler, which comprises a photo diode and a photo sensor. Alternatively, the comparison voltage VCOM can be calculated by the dynamic multi-functional power controller CT employing the current sensing resistor RS and the input power VI.

Preferably, the frequency of the PWM driving signal VGS is dynamically adjusted according to the comparison voltage VCOM so as to reduce loss and greatly increase overall efficiency of power conversion.

In the step S30, the PWM driving signal VGS is immediately not sent and stopped to cut off the conduction current IP flowing through the switching unit Q because the abnormal state occurs, and then, the step S40 is performed by waiting for a preset period of waiting time like 0.5-100 seconds, which is usually called as Over-loading Protection (OLP) Delay Time. In the step S50, the PWM driving signal VGS is re-sent to perform an auto recovery operation, and the power control process returns back to the step S20.

Figure 3:
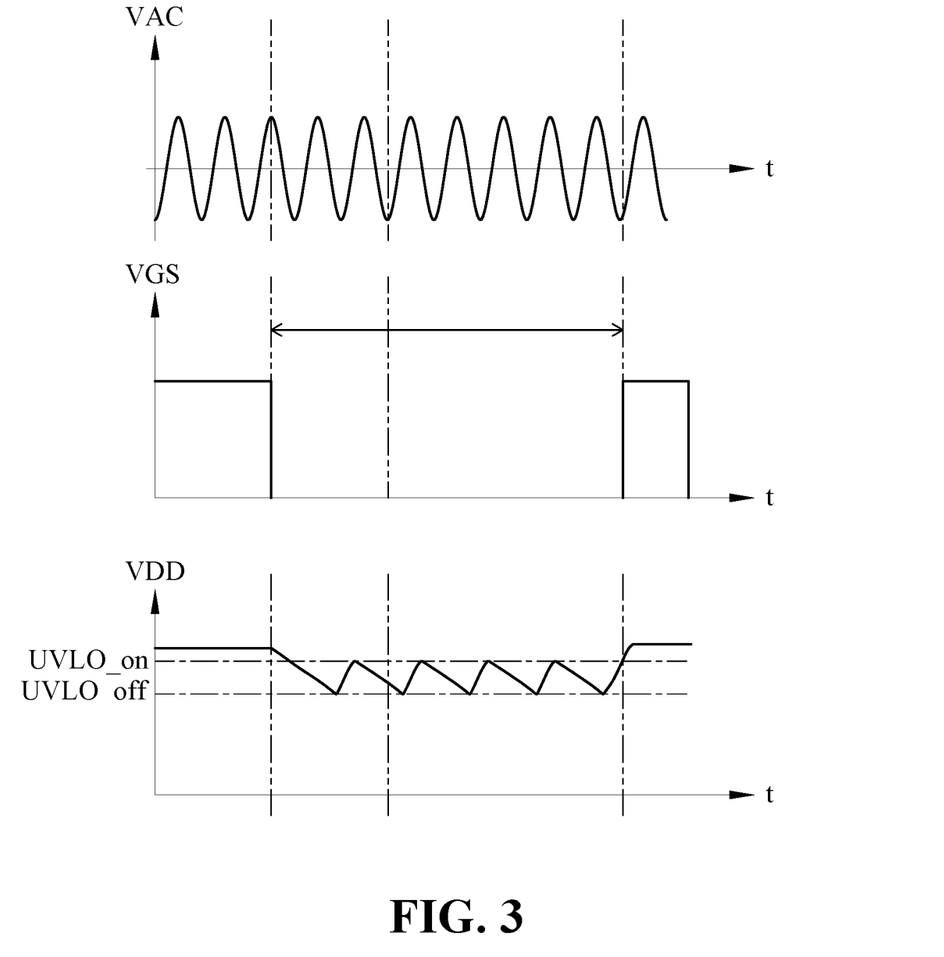
FIG. 3 shows a waveform of the dynamic multi-functional power controller according to the embodiment of the present invention.

Further refer to FIG. 3 illustrating a waveform of the dynamic multi-functional power controller according to the embodiment of the present invention. The waveform comprises the input AC power VAC, the controller power VDD, the PWM driving signal VGS, and the input AC power VAC is continuously fed in.

Moreover, when the abnormal state occurs, the dynamic multi-functional power controller CT of the present invention immediately stops sending the PWM driving signal VGS and then waits for a period of waiting time like 4-40 seconds. During this period, the PWM driving signal VGS is substantially 0V, and the controller power VDD is charged and discharged back and forth between the turn-on voltage UVLO_on and the turn-off voltage UVLO_off. In particular, when the controller power VDD is higher than the turn-on voltage UVLO_on, the PWM driving signal VGS is still not generated until the preset time like 0.5-100 seconds is reached. If the controller power VDD is higher than the turn-on voltage UVLO_on, the power control process begins to determine whether the input AC power VAC is normal. The PWM driving signal VGS is re-generated and re-sent only when the input AC power VAC is normal.

Figure 4:
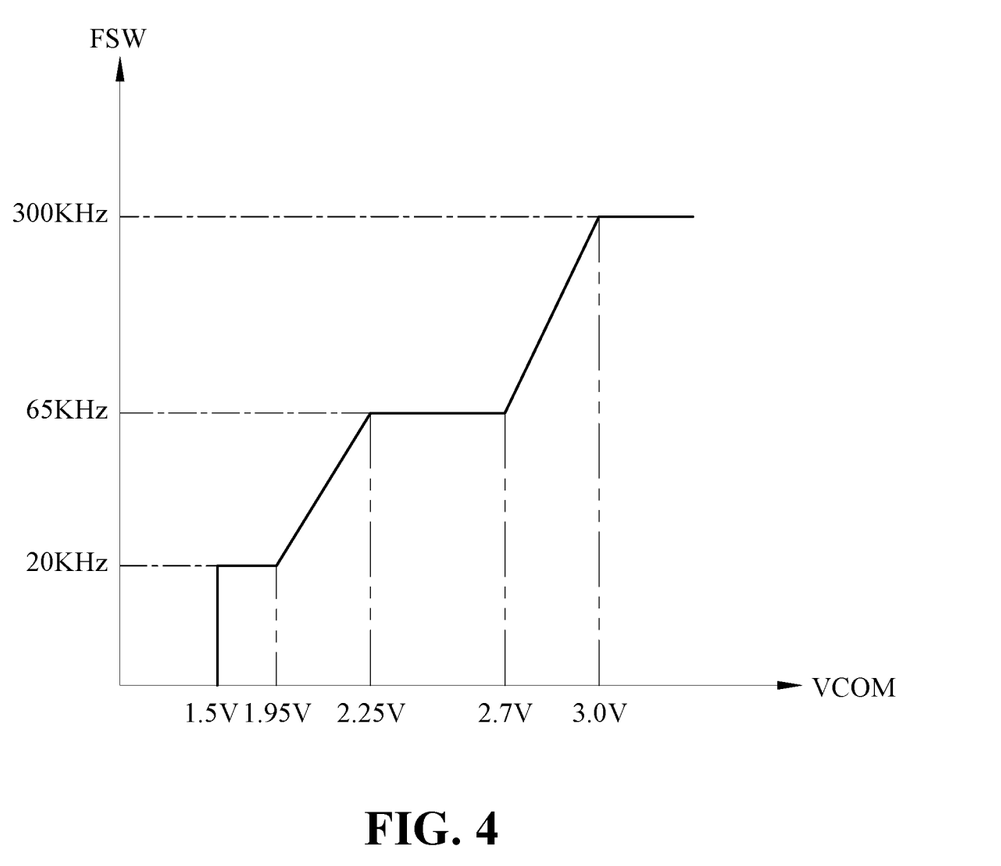
FIG. 4 is a view of the frequency of the PWM driving signal of the dynamic multi-functional power controller according to the embodiment of the present invention.

More specifically, the relationship between the frequency FSW of the PWM driving signal VGS and the comparison voltage VCOM is shown in FIG. 4, and it is clear that the frequency FSW of the PWM driving signal VGS is dynamically adjusted according to the comparison voltage VCOM. Further, if the comparison voltage VCOM is less than 1.5V, the PWM driving signal VGS is not generated, and the frequency FSW of the PWM driving signal VGS is zero. If the comparison voltage VCOM is 1.5-1.95V, the frequency FSW of the PWM driving signal VGS is set to 20 KHz. If the comparison voltage VCOM is 1.95-2.25V, the frequency FSW of the PWM driving signal VGS is linearly increased from 20 KHz to 65 KHz according to the comparison voltage VCOM. If the comparison voltage VCOM is 2.25-2.7V, the frequency FSW of the PWM driving signal VGS is set to 65 KHz. IF the comparison voltage VCOM is 2.7-3.0V, the frequency FSW of the PWM driving signal VGS is linearly increased from 65 KHz to 300 KHz according to the comparison voltage VCOM. Finally, if the comparison voltage VCOM is not less than 3.0V, the frequency FSW of the PWM driving signal VGS is set to 300 KHz.

Return back to FIG. 1. The dynamic multi-functional power controller CT of the present invention immediately stops the PWM driving signal VGS in case of over loading, waits for the preset period of waiting time, and then unconditionally enters the auto recovery operation to re-generate and re-send the PWM driving signal VGS. That is, it is assumed that the abnormal state can be resolved during the preset period of waiting time. However, if the abnormal state lasts long enough to exceed the tolerance of the system, the high current due to the abnormal state may result in serious damage, failure, malfunction or even burning out.

Figure 5:
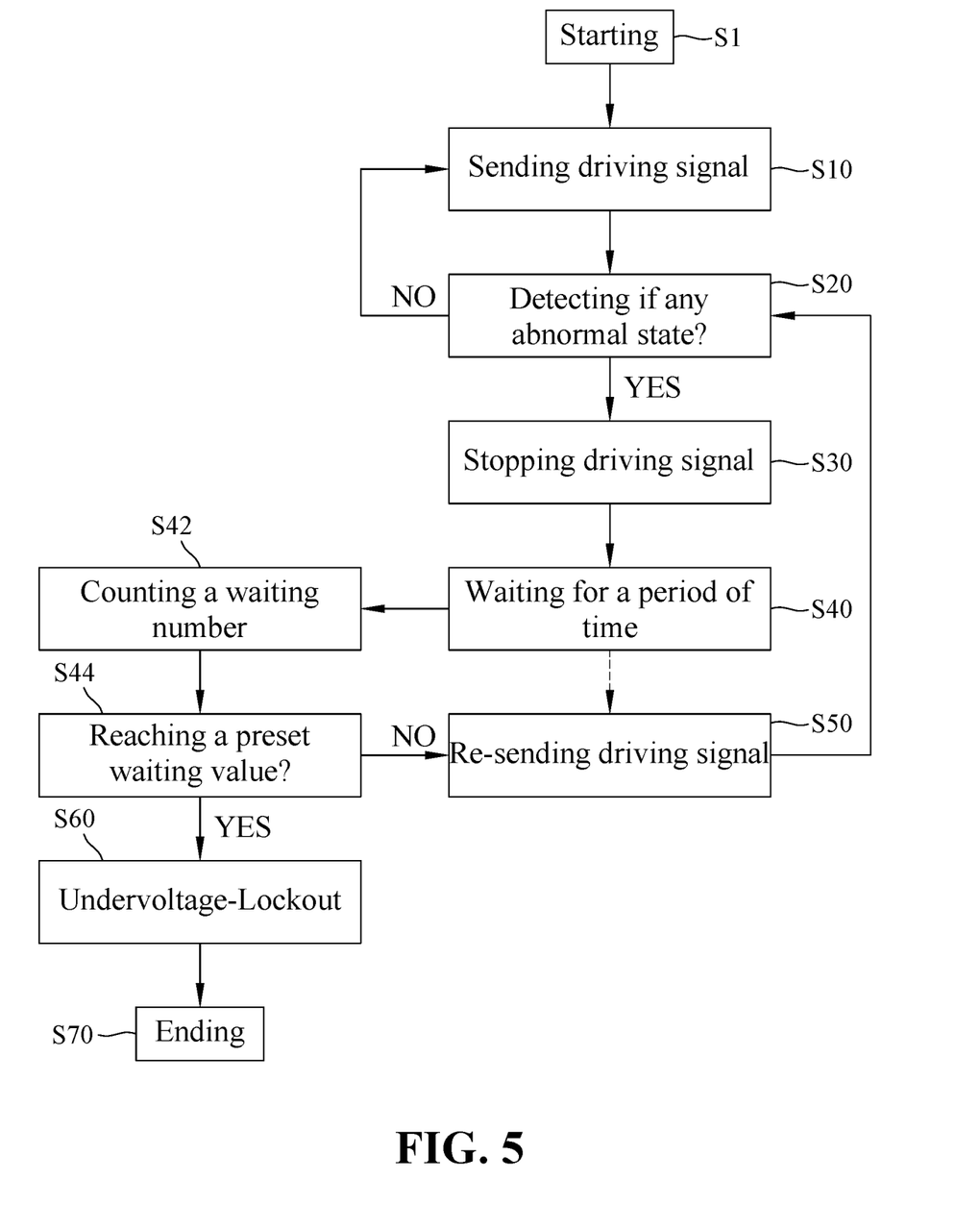
FIG. 5 shows a flowchart of the dynamic multi-functional power controller according to another embodiment of the present invention.

With this, the present invention further provides another embodiment as shown in FIG. 5 to enhance the above flowchart in FIG. 1 and prevent the system from risk of operation and stability due to long time abnormal state.

It should be noted that FIG. 5 discloses an operation mode different from FIG. 1. That is, FIG. 1 is a basic operation mode, and FIG. 4 is an advanced operation mode. It is preferred that the two modes are selected by the user or the system through a specific parameter like mode selection parameter. Specifically, for the flowchart shown in FIG. 5, the steps S42, S44, S60, and S70 are added with respect to FIG. 1, and other steps are the same as FIG. 1 and not described in detail hereinafter. In particular, the step S42 is performed after the step S40, that is, the step S50 is not directed from the step S40. If the basic operation mode is selected through the mode parameter, the step S50 is performed after the step S40 as shown by the dashed line. If the advanced operation mode is selected through the mode parameter, the step S42 is performed after the step S40.

Of course, the feature of the above parameter can be implemented by one selection pin, which is used to select the operation mode based on a logic level. For example, a logic high level is intended to select the advanced operation mode, and a logic low level is intended to select the basic operation mode.

Now, the steps S42, S44, S60, and S70 shown in FIG. 5 will be described in detail. In the step S42, the dynamic multi-functional power controller CT of the present invention starts to count a wait number by increasing one after the period of waiting time, and the wait number is stored in a wait parameter. In the step S44, the power control process determines whether the wait number reaches a preset number, and the preset number is a positive integer number greater than 1. It is preferred that the preset number is selected from 2 to 200, and is previously stored in a preset number parameter.

Specifically, the wait parameter and the preset number parameter are implemented by two discrete registers, and the preset number parameter is previously set. Certainly, the preset number parameter can be set through one additional pin similar to the operation mode selection as mentioned above. However, only two different values can be set. For example, the high logic level for the additional pin is intended to set the preset number parameter as a first preset value like 20, and the low logic level for the additional pin is intended to set the preset number parameter as a second preset value like 200.

Further, if the number parameter does not reach the preset number parameter, the step S50 is performed, the PWM driving signal VGS is re-generated and re-sent, and the power control process returns back to the step S20. If the number parameter reaches the preset number parameter, the step S60 is performed, the PWM driving signal VGS is still not generated, the power control process enters an Under voltage-Lockout (UVLO), and then the step S70 is performed by ending the power control process. In other words, when the number parameter reaches the preset number parameter, the dynamic multi-functional power controller CT of the present invention does not electrically control the power of the system any more, and only the user or the operator can resolve the abnormal state by manually turning off and then turning on the power switch of the system for the input AC power VAC.

Figure 6:
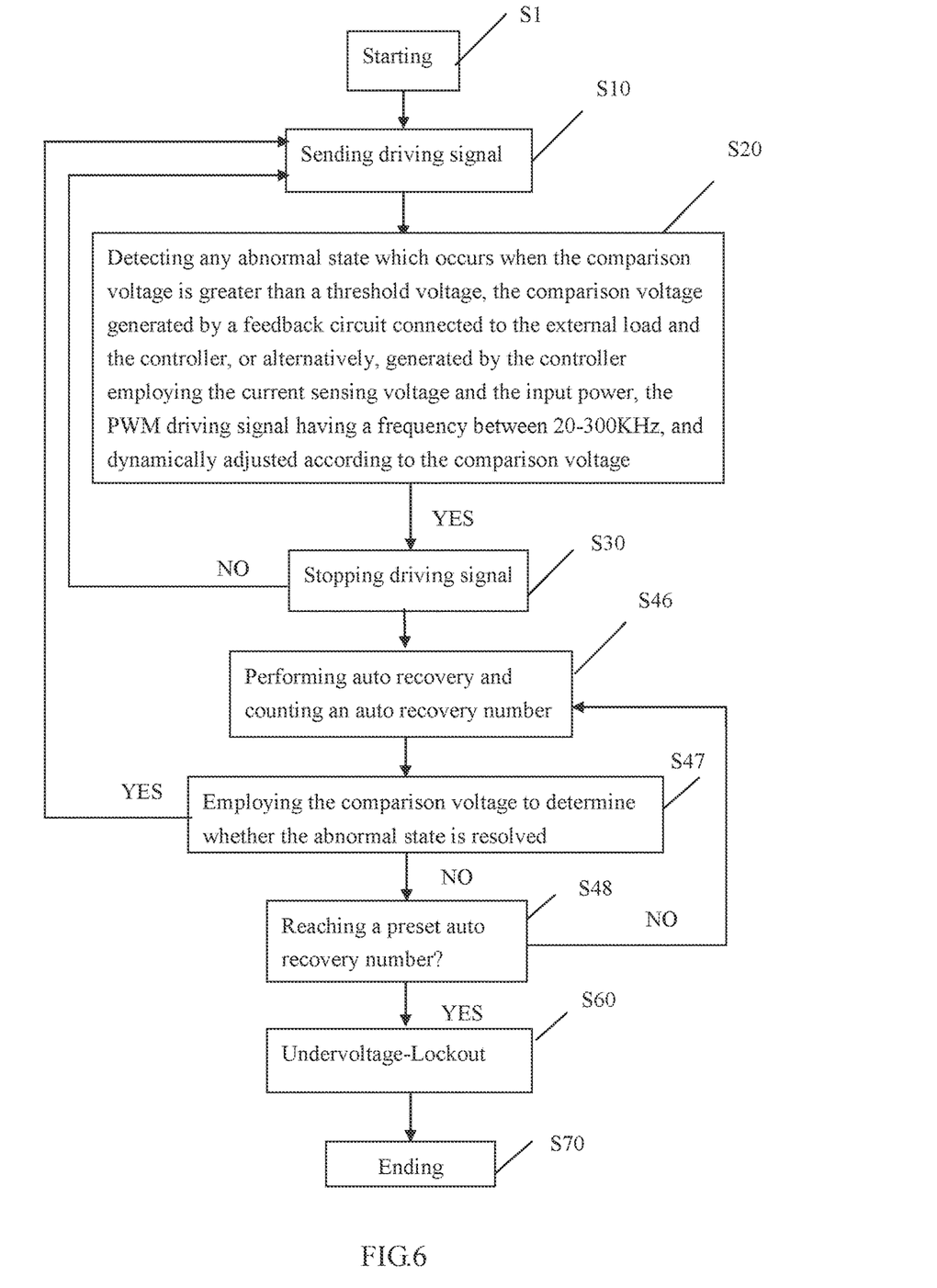
FIG. 6 shows a flowchart of the dynamic multi-functional power controller according to another embodiment of the present invention.
Figure 7:
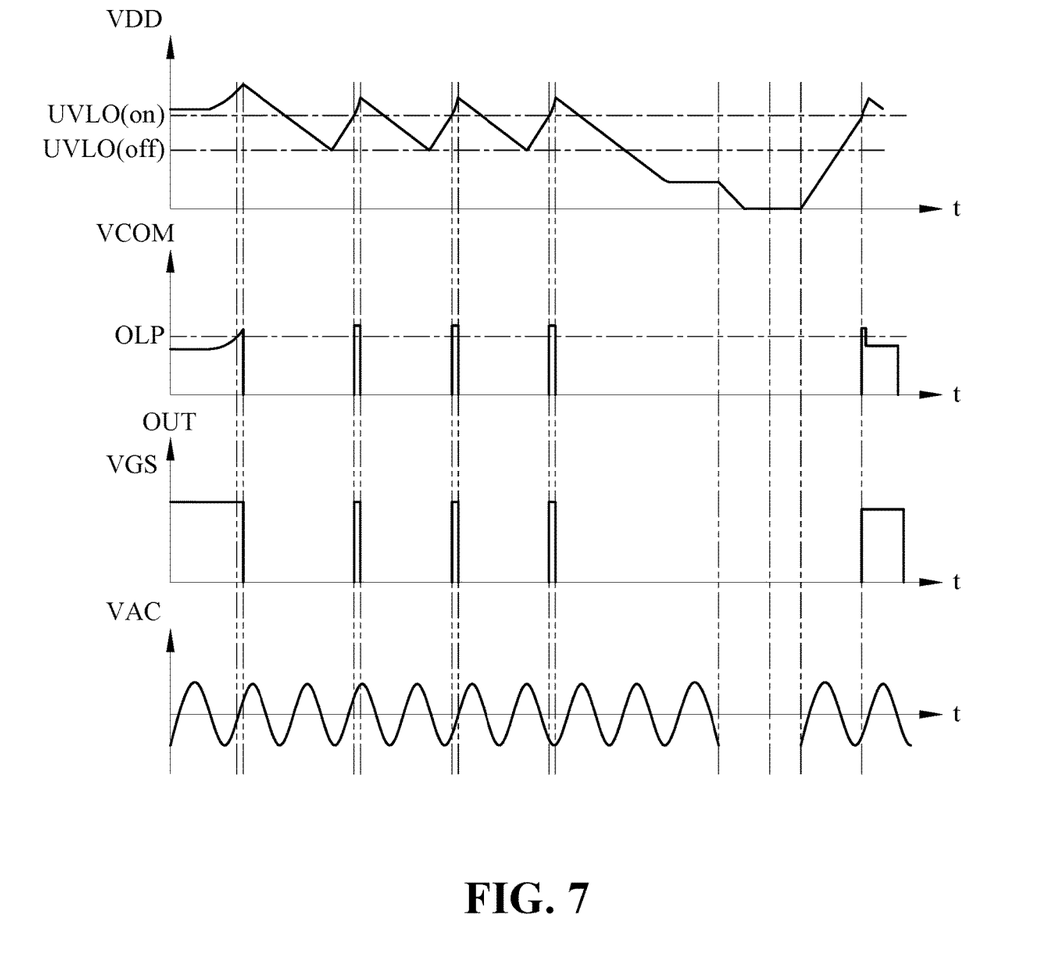
FIG. 7 shows a waveform of the dynamic multi-functional power controller according to the embodiment shown in FIG. 6 of the present invention.

Refer to FIGS. 6 and 7 illustrating a flowchart and a waveform of the dynamic multi-functional power controller according to another embodiment of the present invention, respectively.

As shown in FIG. 6, the dynamic multi-functional power controller according to this embodiment of the present invention performs the power control process comprising the steps S1, S10, S30, S46, S47, S48, S60, and S70 similar to the embodiment shown in FIG. 5, wherein the steps S1, S10, S30, and S60 are well described in the previous embodiment, and only the features of the steps S46, S47, and S48 will be described in detail hereinafter.

As shown in FIG. 7, after the step S30 in which the PWM driving signal VGS is not generated and sent, the power control process enters the step S46 or called as auto recovery step to perform the auto recovery operation and count an auto recovery number by increasing one. At this time, the comparison voltage VCOM drops to 0V and the controller power VDD continuously decreases to the turn-off voltage UVLO_off, and then increases up to the turn-on voltage UVLO_on. Thus, the comparison voltage VCOM is re-generated. The dynamic multi-functional power controller CT re-generates the PWM driving signal VGS based on the current comparison voltage VCOM. In other words, the whole operation of the step S46 is usually called auto recovery operation. It should be noted that the above auto recovery number is previously set to zero in the step S1, that is, the auto recovery number is assigned a default value as zero upon powering on.

The step S47 is then performed after the step S46. In the step S47, the comparison voltage VCOM is employed to determine whether the abnormal state is resolved. If the abnormal state is resolved, the auto recovery number is set to zero, and the power control process returns back to the step S10, that is, the signal generating step. If the abnormal state is not resolved, the step S48 is performed. In step S48, the power control process determines whether the auto recovery number reaches a preset auto recovery number. If the auto recovery number does not reach the preset auto recovery number, the power control process returns back to the step S46, that is, the auto recovery step. If the auto recovery number reaches the preset auto recovery number, the power control process performs the step S60 and enters Under voltage-Lockout (UVLO) like the step 60 of the embodiment shown in FIG. 5.

Therefore, the key feature of the embodiment shown in FIG. 6 is to directly enter Under voltage-Lockout according to the auto recovery number when the abnormal state is not resolved and the system suffers from a high power condition, thereby avoiding functional failure. At this time, the dynamic multi-functional power controller CT is recovered to normal operation only by manually pulling out the power line from the power socket to switch off the power, and then inserting the power line into the power socket to switch on the power.

From the above mentioned, one of the features provided by the present invention is to handle various kinds of peak loading by employing the over-loading protection delay time, actively detect one of the instantaneous output current and the instantaneous output power, and one of the average output current and the average output power, and provide appropriate protection by immediately stopping sending the driving signal in case of abnormal state, and then re-sending the driving signal after a period of time (that is, over-loading protection delay time), thereby avoiding long time high power state because of abnormal state being not resolved and further reducing the average output power to implement power saving.

Another feature of the present invention is to employ the wait number to determine whether to enter Under voltage-Lockout, thereby avoiding high risk of damage to electric and electronic elements due to abnormal state being not resolved for a long period of time.

An yet feature of the present invention is to employ the auto recovery number to determine whether to enter Under voltage-Lockout, thereby avoiding damage to electric and electronic elements caused by many times of the auto recovery operation while the abnormal state being not resolved for a long period of time.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A dynamic multi-functional power controller for performing a power control process to generate and send a Pulse Width Modulation (PWM) driving signal for driving a switching unit connected to the dynamic multi-functional power controller, a primary side coil, the switching unit, and a current sensing resistor being sequentially connected in series between an input power and a ground level, a conduction current flowing through the primary side coil employed to induce an induced current flowing through a secondary side coil coupled with the primary side coil due to electromagnetic interaction, the induced current flowing through an output rectification unit and an output filter unit connected in series, the output rectification unit and the output filter unit generating an output power to supply an external load, two ends of the current sensing resistor generating a current sensing voltage resulting from the conduction current, the power control process comprising:
  a starting step, in which a system comprising the dynamic multi-functional power controller, the switching unit, the primary side coil, the secondary side coil, the current sensing resistor-, the output rectification unit, and the output filter unit is powered on;

a signal generating step, in which the PWM driving signal is generated and sent to the switching unit to conduct or cut off the conduction current of the switching unit;

a detection step, in which a comparison voltage corresponding to the output power is employed to detect any abnormal state which occurs when the comparison voltage is greater than a threshold voltage;

in case of no abnormal state, the power control process returning back to the signal generating step to continuously send the PWM driving signal; and if an abnormal state occurs, the PWM driving signal being not generated, the power control process waiting for a period of waiting time, then the PWM driving signal being re-sent to perform an auto recovery operation, and the power control process returning back to the detection step, wherein the comparison voltage is calculated by the dynamic multi-functional power controller employing the current sensing voltage and the input power, and the PWM driving signal has a frequency between 20-300 KHz, and is dynamically adjusted according to the comparison voltage.

2. The dynamic multi-functional power controller as claimed in claim 1, wherein the period of waiting time is 0.5-100 seconds.

3. The dynamic multi-functional power controller as claimed in claim 1, wherein the input power is generated by a rectification unit through a rectification process and receiving an input alternative current (AC) power, and the AC power is 90-400V, and has a frequency of 50, 60, or 400 Hz.

4. The dynamic multi-functional power controller as claimed in claim 1, wherein the PWM driving signal is not generated if the comparison voltage is less than 1.5V; the frequency of the PWM driving signal is set to 20 KHz if the comparison voltage is 1.5-1.95V; the frequency of the PWM driving signal is linearly increased from 20 KHz to 65 KHz according to the comparison voltage if the comparison voltage is 1.95-2.25V; the frequency of the PWM driving signal is set to 65 KHz if the comparison voltage is 2.25-2.7V; the frequency of the PWM driving signal is linearly increased from 65 KHz to 300 KHz according to the comparison voltage if the comparison voltage is 2.7-3.0V; and the frequency of the PWM driving signal is set to 300 KHz if the comparison voltage is not less than 3.0V.

5. The dynamic multi-functional power controller as claimed in claim 1, wherein the switching unit comprises a Metal-Oxide-Semiconductor (MOS) element or a bipolar element.

6. The dynamic multi-functional power controller as claimed in claim 1, further being in collocation with a controller rectification unit for outputting a controller power to perform the power control process, wherein the controller rectification unit receives the input AC power, and generates the controller power through an auxiliary rectification process.

7. The dynamic multi-functional power controller as claimed in claim 6, wherein the power control process determines if the controller power is larger than a turn-on voltage when the abnormal state occurs and the period of waiting time passes; when the controller power is larger than the turn-on voltage, the power control process determines if the input AC power is normal; when the input AC power is normal, the PWM driving signal is re-generated to perform the auto recovery operation; and when the input AC power is not normal, the PWM driving signal is not generated.

8. The dynamic multi-functional power controller as claimed in claim 1, further comprising:

increasing a wait number by one after the period of waiting time, the wait number being preset to zero as a default value after powering on;

determining whether the wait number reaches a preset number, the preset number being a positive integer number greater than 1;

if the wait number does not reach the preset number, the PWM driving signal being re-sent to perform the auto recovery operation, and the power control process returning back to the detection step;

if the wait number reaches the preset number, the PWM driving signal being still not generated and the power control process entering an Under voltage-Lockout (UVLO) state; and ending the power control process.

9. The dynamic multi-functional power controller as claimed in claim 8, wherein the preset number is 2~200.

10. A dynamic multi-functional power controller for performing a power control process to generate and send a Pulse Width Modulation (PWM) driving signal for driving a switching unit connected to the dynamic multi-functional power controller, a primary side coil, the switching unit, and a current sensing resistor being sequentially connected in series between an input power and a ground level, a conduction current flowing through the primary side coil employed to induce an induced current flowing through a secondary side coil coupled with the primary side coil due to electromagnetic interaction, the induced current flowing through an output rectification unit and an output filter unit connected in series, the output rectification unit and the output filter unit generating an output power to supply an external load, two ends of the current sensing resistor generating a current sensing voltage resulting from the conduction current, the power control process comprising:

a starting step, in which a system comprising the dynamic multi-functional power controller, the switching unit, the primary side coil, the secondary side coil, the switching unit, the current sensing resistor-, the output rectification unit, and the output filter unit is powered on, and an auto recovery number is set to zero;

a signal generating step, in which the PWM driving signal is generated and sent to the switching unit to conduct or cut off the conduction current of the switching unit;

a detection step, in which a comparison voltage corresponding to the output power is employed to detect any abnormal state which occurs when the comparison voltage is greater than a threshold voltage;

in case of no abnormal state, the power control process returning back to the signal generating step to continuously send the PWM driving signal;

if an abnormal state occurs, an auto recovery step being performed, the PWM driving signal being not generated, the power control process waiting for a period of waiting time, then the PWM driving signal being regenerated and re-sent to perform an auto recovery operation, and the power control process increasing the auto recovery number by one, employing the comparison voltage to determine whether the abnormal state is resolved;

if the abnormal state is resolved, the auto recovery number being set to zero, and the power control process returning back to the signal generating step;

if the abnormal state is not resolved, the power control process determining whether the auto recovery number reaching a preset auto recovery number;

if the auto recovery number does not reach the preset auto recovery number, the power control process returning back to the auto recovery step;

if the auto recovery number reaches the preset auto recovery number, the power control process entering an Under voltage-Lockout (UVLO) state; and ending the power control process;

wherein the comparison voltage is calculated by the dynamic multi-functional power controller employing the current sensing voltage and the input power.

* * * * *